United States Patent
Matsuda

(10) Patent No.: US 12,108,710 B2
(45) Date of Patent: Oct. 8, 2024

(54) METHOD FOR CULTIVATING STRAWBERRY

(71) Applicant: MD-FARM INC., Shibata (JP)

(72) Inventor: Yuki Matsuda, Shibata (JP)

(73) Assignee: MD-FARM INC., Shibata (JP)

( * ) Notice: Subject to any disclaimer, the term of this patent is extended or adjusted under 35 U.S.C. 154(b) by 141 days.

(21) Appl. No.: 17/926,248

(22) PCT Filed: May 19, 2020

(86) PCT No.: PCT/JP2020/019804
§ 371 (c)(1),
(2) Date: Nov. 18, 2022

(87) PCT Pub. No.: WO2021/234823
PCT Pub. Date: Nov. 25, 2021

(65) Prior Publication Data
US 2023/0189728 A1    Jun. 22, 2023

(51) Int. Cl.
*A01G 22/05* (2018.01)
*A01G 7/02* (2006.01)
*A01G 7/04* (2006.01)

(52) U.S. Cl.
CPC .............. *A01G 22/05* (2018.02); *A01G 7/02* (2013.01); *A01G 7/045* (2013.01)

(58) Field of Classification Search
CPC ................................ A01G 22/05; A01G 22/00
See application file for complete search history.

(56) References Cited

U.S. PATENT DOCUMENTS

2023/0292681 A1 * 9/2023 Hattori ..................... A01G 9/24
47/58.1 R

FOREIGN PATENT DOCUMENTS

| | | | |
|---|---|---|---|
| JP | 2001-250507 A | 9/2001 | |
| JP | 2016-167990 A | 9/2016 | |
| JP | 6296596 B2 | 3/2018 | |
| JP | 2019-000044 A | 1/2019 | |
| KR | 10-1321336 B1 | 10/2013 | |
| WO | WO-2007058347 A1 * | 5/2007 | .............. A01G 7/06 |
| WO | 2014/148654 A1 | 9/2014 | |

OTHER PUBLICATIONS

PCT/ISA/210, "International Search Report for PCT International Application No. PCT/JP2020/019804," Jul. 14, 2020.
PCT/ISA/237, "Written Opinion for PCT International Application No. PCT/JP2020/019804," Jul. 14, 2020.
Strawberry Laboratory etc., "Successful Anniversary /Mass Production from Sees in Strawberry Plant Factory," Plant Factories/Agriculture Business Online.

* cited by examiner

*Primary Examiner* — Kristen C Hayes
(74) *Attorney, Agent, or Firm* — HAUPTMAN HAM, LLP

(57) ABSTRACT

To stabilize and improve efficiency of continuous flowering while eliminating season dependency in strawberry cultivation. First, a strawberry seed is germinated by controlling an environment adjusting device installed in a closed environment so as to achieve a first cultivation environment suitable for germination of strawberry. Next, a strawberry seedling germinated is grown by controlling the environment adjusting device so as to achieve a second cultivation environment suitable for growing strawberry seedling. Next, the strawberry seedling is further grown to cause a terminal flower cluster to flower by controlling the environment adjusting device so as to achieve a third cultivation environment suitable for flowering of the terminal flower cluster. Then, first and subsequent axillary flower clusters are caused to successively flower by controlling the environment adjusting device so as to achieve a fourth cultivation environment suitable for flowering of the first and subsequent axillary flower clusters.

9 Claims, 3 Drawing Sheets

METHOD FOR CULTIVATING STRAWBERRY

RELATED APPLICATIONS

The present application is National Phase of International Application No. PCT/JP2020/019804 filed May 19, 2020, the disclosure of which is hereby incorporated by reference herein in its entirety.

TECHNICAL FIELD

The present invention relates to a method for cultivating strawberry in a closed environment, and particularly relates to continuous flowering of strawberry.

BACKGROUND ART

For example, Patent Literature 1 discloses a strawberry cultivation method in which a fruit of a strawberry grown in one season is harvested over a year. In this cultivation method, first, a strawberry grown in one season is subjected to forcing cultivation in a glass greenhouse under natural conditions. Next, after harvesting fruit from the strawberry subjected to forcing cultivation, the strawberry stock is moved to an environmental chamber capable of being irradiated with artificial light and in which a cultivation environment is maintained in a certain range. In this cultivation environment, the day length condition is 8 to 10 hours, the temperature is 8 to 26° C., the concentration of carbon dioxide is 400 to 850 ppm, and the humidity is 30 to 100%. Then, in such an environmental chamber, the cultivation of the strawberry stock once harvested is continued. Thus, the fruit can be continuously harvested from the strawberry stock over the year.

In addition, although not limited to the cultivation of strawberries, Patent Literature 2 discloses a method for cultivating plants that enables production of fruits such as olives in a season different from the season of fruiting under natural conditions by using an artificial-light-type closed environment and a sunlight use environment in combination. The cultivation method includes a first step of placing a plant under a first environmental condition, a second step of placing a plant under a second environmental condition for inducing flowering, and a third step of placing a plant under a third environmental condition for maturing a fruit. The first environmental conditions are set in an artificial-light-type closed environment (first treatment section), and the day length is 8 to 10 hours, the temperature in the light phase is 11 to 14° C., and the temperature in the dark phase is 9 to 12° C. The second environmental conditions are set in an artificial-light-type closed environment (second treatment section), and the day length is 10 to 11 hours, the temperature in the light phase is 17 to 22° C., and the temperature in the dark phase is 10 to 15° C. Also, the third environmental conditions are set in a sunlight use environment (third treatment section), and the day length is 12 to 13 hours, the temperature in the light phase is 20 to 30° C., and the temperature in the dark phase is 15 to 20° C.

CITATION LIST

Patent Literature

Patent Literature 1: JP 6296596 B2
Patent Literature 2: JP 2019-44 A

SUMMARY OF INVENTION

Technical Problem

In Patent Literature 1 described above, prior to cultivation in an environmental chamber (closed environment), forcing cultivation in a glass greenhouse (non-closed environment) is performed. Forcing cultivation in the glass greenhouse is strongly affected by natural environments such as sunlight and outside air, and thus has the following problems. First, season dependency exists in the cultivation season. In this regard, Patent Literature 1 describes that seedlings harvested around July are planted in September to early October, and after fruits are sufficiently harvested under forcing cultivation (for example, in the middle of May), a strawberry stock is moved to an environmental chamber. Secondly, variations in quality such as size, color, and taste are likely to occur between the fruit harvested in the glass greenhouse and the fruit subsequently harvested in the environmental chamber. Then, thirdly, there is a possibility that the strawberry is contaminated with viruses and the like during forcing cultivation in the glass greenhouse, and the strawberry may become sick also during subsequent cultivation in the environmental chamber.

Therefore, an object of the present invention is to stabilize and improve efficiency of continuous flowering while eliminating the season dependency in the cultivation of strawberry.

Solution to Problem

In order to solve such a problem, the present invention provides a method for cultivating strawberry in a closed environment in which a cultivation environment including temperature is adjusted by an environment adjusting device. This cultivation method includes the following steps. First, in a first step, a strawberry seed is germinated by controlling an environment adjusting device so that the cultivation environment is at a first temperature. Next, in a second step, a strawberry seedling germinated is grown by controlling the environment adjusting device so that the cultivation environment is at a second temperature. Next, in a third step, the strawberry seedling is further grown to cause a terminal flower cluster to flower by controlling the environment adjusting device so that the cultivation environment is at a third temperature lower than the first temperature and the second temperature. Then, in a fourth step, first and subsequent axillary flower clusters are caused to successively flower by controlling the environment adjusting device so that the cultivation environment is at a fourth temperature lower than the first temperature and the second temperature and higher than the third temperature.

In the present invention, it is preferable that artificial light necessary for strawberry to perform photosynthesis is irradiated as an element of the cultivation environment by the environment adjusting device, and the photon flux density of artificial light emitted by the environment adjusting device is 350 μmol or more. In this case, the irradiation times of artificial light in the first to third steps may be longer than that in the fourth step. Also, the irradiation time of artificial light in the first step may be equal to or shorter than those in the second and third steps. Further, the second and third steps may be all-day irradiation. Furthermore, in the fourth step, an irradiation pattern having an irradiation time zone in which irradiation with artificial light is performed and a non-irradiation time zone in which the irradiation with artificial light is not performed may be repeated every day.

In the present invention, it is preferable that the concentration of carbon dioxide as an element of the cultivation environment is adjusted by the cultivation environment device, and the carbon dioxide concentrations during artificial light irradiation in the first and second steps are lower than those in the third and fourth steps. In this case, the carbon dioxide concentrations during artificial light irradiation in the third and fourth steps are preferably 800 ppm or more.

In the present invention, it is preferable that the environment adjusting device is feedback-controlled so as to achieve the first to fourth cultivation environments based on the information regarding the cultivation environment detected by a sensor installed in the closed environment. In addition, an ultraviolet light source may be used as a guide light that promotes pollination by a bee released into the closed environment.

In the present invention, the first and second steps may be performed in a first cultivation chamber which is a closed environment, and the third and fourth steps may be performed in a second cultivation chamber which is a closed environment. In this case, as a fifth step, the strawberry seedling grown in the second step is moved from the first cultivation chamber to the second cultivation chamber.

Advantageous Effects of Invention

According to the present invention, all steps from the germination to continuous flowering of the first and subsequent axillary flower clusters of strawberry is completed in the closed environment. As a result, the strawberry can be cultivated under the management environment regardless of the season without being affected by natural environments such as sunlight and outside air, so that the season dependency of the strawberry cultivation can be eliminated. Further, there is no risk of virus contamination or the like by cutting off contact with the outside, so that healthy strawberries can be cultivated. Furthermore, by classifying into the first to fourth steps and controlling the cultivation environments suitable for each step in consideration of growth characteristics unique to strawberry, and the like, it is possible to stabilize and improve the efficiency of continuous flowering of strawberry. In particular, by setting the temperature in the first to fourth steps to a magnitude relationship as defined by the present invention, continuous flowering can be efficiently performed.

DESCRIPTION OF EMBODIMENTS

Figure 1:
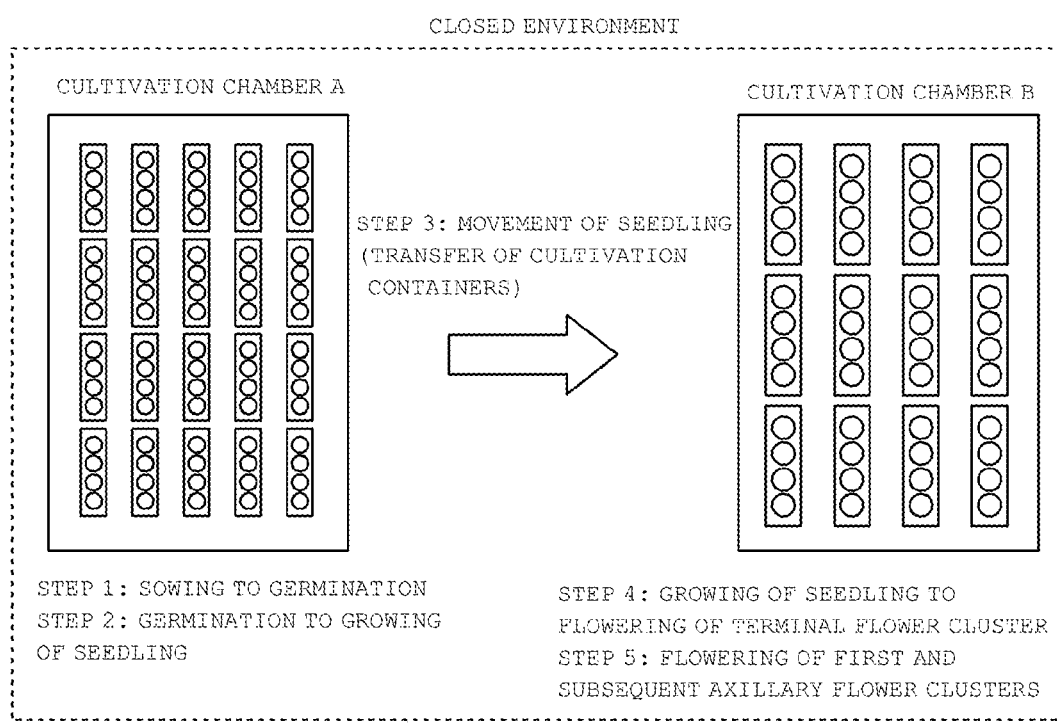
FIG. 1 is an explanatory diagram of a strawberry cultivation step in a closed environment.

FIG. 1 is an explanatory diagram of a strawberry cultivation step in a closed environment according to the present embodiment. A feature of the present embodiment is that all steps from sowing to continuous flowering (harvesting) of strawberry are completed in the closed environment. Here, the "closed environment" is a closed space separated from the outside, and refers to an environment that is not affected or is hardly affected by outside air such as temperature and humidity, and is also referred to as a plant cultivation factory. In such a closed environment, temperature, humidity, carbon dioxide concentration and the like are controlled by an environment adjusting device to be described later, and artificial light is used instead of sunlight as light necessary for a plant to perform photosynthesis. In the closed environment, outside air and sunlight become disturbance factors that affect the quality of the fruit and the cultivation period, so that these influences are eliminated as much as possible. In this respect, a simple greenhouse such as a vinyl house or a plastic greenhouse is not included in the closed environment because it is strongly affected by outside air or the like even if it is provided with air conditioning facility or the like.

In the present embodiment, a plurality of cultivation chambers A and B divided from the outside by a heat insulating material is prepared as a cultivation space as a closed environment. In each of cultivation chambers A, B, cultivation shelves on which cultivated products (strawberry seedlings and strawberry strains) are placed are arranged in rows. First, in the cultivation chamber A, previous steps of the strawberry cultivation, that is, step 1 from the sowing to germination of the strawberry, and step 2 from the germination to growing of the strawberry seedling are performed. Thereafter, as step 3, the strawberry seedlings are moved from the cultivation chamber A to the cultivation chamber B. Then, in the cultivation chamber B, post steps of the strawberry cultivation, that is, step 4 of further growing the strawberry seedlings until the terminal flower cluster flowers, and step 5 of successively and continuously causing the first and subsequent axillary flower clusters (first axillary flower cluster, second axillary flower cluster, . . . ) flower after flowering of the terminal flower cluster flower. In the present embodiment, the growing of strawberry seedling straddles step 2 and step 4, but the timing of shifting from step 2 to step 4 is managed based on the period of the step as in other steps. In addition, step 5 includes a step of fruiting the terminal flower cluster opened in step 4 and a step of causing the first and subsequent axillary flower clusters to flower and fruit, and a step of harvesting red ripe strawberry fruits at any time is also included in step 5. Such cycles of flowering and harvesting are repeated continuously until the strawberry stock dies.

The reason why the closed environment is divided into the two cultivation chambers A and B is to improve mass productivity by dividing the cultivation environment according to the size of the cultivated product such that even small strawberry seedlings are densely arranged in the cultivation chamber A, and thereafter, small strawberry seedlings are sparsely (the interval between the cultivated products is further increased) arranged in another cultivation chamber B. In addition, in step 3 of moving the cultivated product from the cultivation chamber A to the cultivation chamber B, in order to secure a root region of the strawberry seedling, it is preferable to transfer the strawberry seedling from a cultivation container (such as a pot or a planter) used for the cultivation in cultivation chamber A to a cultivation container with a larger size than the cultivation container. However, if it is not necessary to consider this point, all steps of the strawberry cultivation may be completed in one cultivation chamber. In addition, as the culture soil used for strawberry cultivation, it is preferable to use inorganic culture soil free from the risk of virus contamination. In addition to the cultivation in the closed environment, it is possible to further enhance the health and safety of the cultivated product by using the inorganic culture soil.

Figure 2:
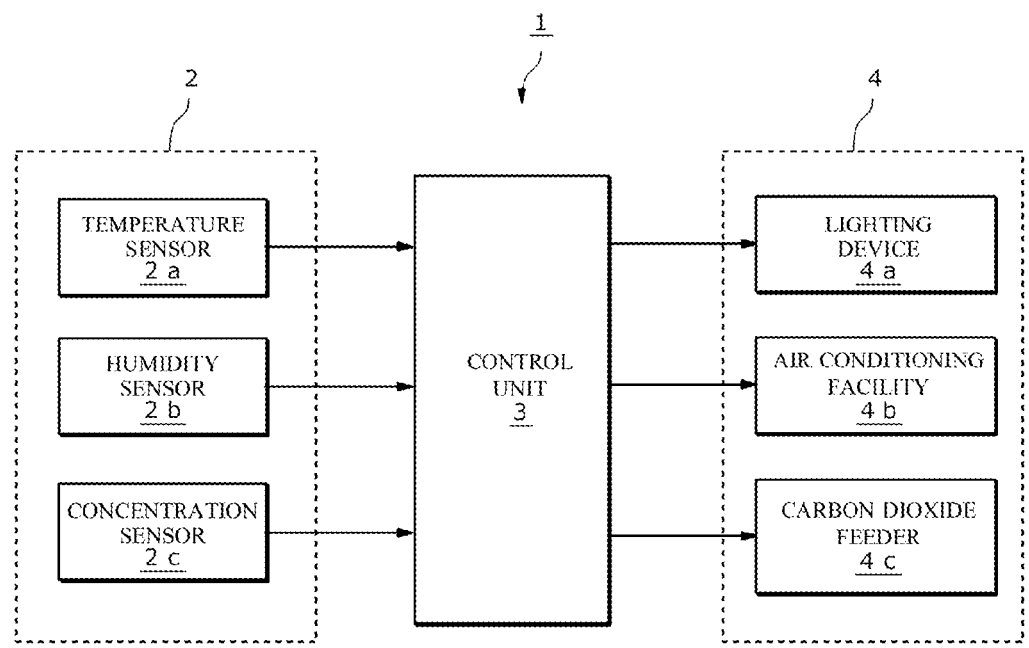
FIG. 2 is a configuration diagram of an environmental control system.

FIG. 2 is a configuration diagram of an environmental control system. Environmental control system 1 is installed in each of the cultivation chambers A and B which are closed environments independent from each other, and independently controls the cultivation environment of strawberry for each cultivation chamber. The environmental control system 1 includes environment sensor 2, control unit 3, and environment adjusting device 4. The environment sensor 2 is installed in a closed environment, and detects a state related to the cultivation environment. As the environment sensor 2, there are temperature sensor 2a that detects the temperature of the closed environment, humidity sensor 2b that detects the humidity of the closed environment, and concentration sensor 2c that detects the carbon dioxide concentration in the closed environment. Based on the information detected by the environment sensor 2, the control unit 3 feedback-controls the environment adjusting device 4 so that the closed environment becomes a desired cultivation environment.

The environment adjusting device 4 is installed in a closed environment and controls the state of the closed environment. The environment adjusting device 4 includes lighting device 4a, air conditioning facility 4b, and carbon dioxide feeder 4c. The lighting device 4a includes a light source (LED) that emits artificial light, and supplies light energy necessary for the cultivated product to perform photosynthesis. The photon flux density of the artificial light emitted by the lighting device 4a is preferably 350 μmol or more in order to supply sufficient light energy to the cultivated product. The air conditioning facility 4b adjusts the temperature and humidity in the closed environment so as to have a temperature and humidity suitable for each step of strawberry cultivation and so as to offset a temperature rise due to heat generation of the lighting device 4a. Note that an ultraviolet light source (UV light source) may be provided as the lighting device 4a, and the cultivated product may be artificially irradiated with ultraviolet light. By using the ultraviolet light source as a guide light, a bee (for example, bumblebee) released into the closed environment can recognize the strawberry flower, so that it becomes possible to promote pollination by a bee without bothering people. The carbon dioxide feeder 4c mainly includes a carbon dioxide cylinder and an on-off valve. The carbon dioxide feeder 4c adjusts the carbon dioxide concentration in the closed environment so as to have a carbon dioxide concentration suitable for each step of strawberry cultivation and to supplement the carbon dioxide consumed by photosynthesis of the cultivated product.

Under control by the control unit 4, the environment adjusting device 4 operates so that the cultivation environment becomes a predetermined state according to the growth stage of strawberry. In the present embodiment, the growth stage of strawberry is classified into four steps from the viewpoint of promoting growth and improving efficiency. Specifically, in step 1 of germinating a strawberry seed, it is controlled so as to achieve a first cultivation environment suitable for germination of strawberry. In step 2 of growing a strawberry seedling germinated, it is controlled so as to achieve a second cultivation environment suitable for growing strawberry seedling. In step 4 of further growing the strawberry seedling and causing the terminal flower cluster to flower, it is controlled so as to achieve a third cultivation environment suitable for flowering of the terminal flower cluster. Then, in step 5 of causing the first and subsequent axillary flower clusters to successively flower, it is controlled so as to achieve a fourth cultivation environment suitable for flowering of the first and subsequent axillary flower clusters. Here, the transition from the third cultivation environment (step 4) to the fourth cultivation environment (step 5) is performed based on the flowering of the terminal flower cluster, not after fruiting of the terminal flower cluster or harvesting of the fruit, from the viewpoint of improving the cultivation efficiency. This point is a feature in step classification in the present embodiment. In addition, the first to fourth cultivation environments basically have different states and conditions. However, as described later, some of the cultivation environments may be the same as each other as long as it is not necessary to consider a specific matter (energy saving property). An example of the cultivation environment in each step is shown in the following table.

TABLE 1

| Cultivation process | Cultivation environment | | | |
|---|---|---|---|---|
| | Temperature | Irradiation time | $CO_2$ concentration | Humidity |
| Step 1: Sowing to germination | 25° C. | 16 H(24 H) | 400 ppm | 60~90% |
| Step 2: Germination to growing of seedling | 25° C. | 24 H | 400 ppm | |
| Step 4: Growing of seedling to flowering of terminal flower cluster | 20° C. | 24 H | 1100 ppm | |
| Step 5: Flowering of first and subsequent axillary flower clusters | 22° C. | 12 H | 1100 ppm | |

First, the humidity, which is an element of the cultivation environment, is kept within a range of 60 to 90% in all four steps 1 to 2 and 4 to 5. This is based on the knowledge that no significant difference was found in growth speed even when the humidity was variably set for each step as a result of a demonstration experiment performed by the inventor. However, as the cultivation environment, the humidity in the closed environment may also be changed for each step.

The temperature (during irradiation with artificial light), which is an element of the cultivation environment, is the most important element in efficiently cultivating strawberry. As an example, temperature T1 in step 1 is set to 25° C., temperature T2 in step 2 is set to 25° C., temperature T4 in step 4 is set to 20° C., and temperature T5 in step 5 is set to 22° C. In step 5, in order to artificially create the temperature difference between day and night, the temperature is set to be lower during non-irradiation with artificial light than during irradiation with artificial light.

Here, the overall relationship of temperature is T1, T2>T4, T5. Steps 1 to 2 are mainly based on leaf growth, and in order to promote leaf growth, it is preferable to set the temperature higher than that in steps 4 to 5. In addition, the relationship of temperature in steps 4 to 5 is $T4<T5$. Steps 4 and 5 are common in that they involve flowering of strawberry stock, but when temperature T4 in step 4 is made the same as temperature T5 in step 5, the strawberry in step 4 enters vegetative growth called "spindly growth", which leads to a decrease in the supply of nutrients to the fruit. Therefore, in step 4, it is effective to perform temperature adjustment to avoid "spindly growth". However, if it is not necessary to focus this point, $T4=T5$ may be satisfied. On the other hand, in step 5, it is preferable to set the temperature to a slightly higher temperature ($T5>T4$) with a focus on increasing the speed of fruit formation after flowering, in other words, increasing the rotation rate of harvest. However, when $T5 \geq T1$ and T2, runners (stems like thin strings) increase and flowering is suppressed, and thus it is important to set $T5<T1$ and T2 in order to perform efficient continuous flowering.

As for the irradiation time, which is an element of the cultivation environment, irradiation time t1 in step 1 is set to 16 hours/day, irradiation time t2 in step 2 is set to 24 hours/day, irradiation time t4 in step 4 is set to 24 hours/day, and irradiation time t5 in step 5 is set to 12 hours/day. Here, the overall relationship of irradiation time is t1, t2, and $t4>t5$. The reason is derived from the difference in cultivation focus between steps 1 to 2 and 4 and step 5. In the former steps 1 to 2 and 4, the focus is on leaf growth, and it is effective to promote leaf growth by giving a larger amount of light than in the latter step 5. On the other hand, the latter step 5 focuses on fruit formation rather than leaf growth, and artificially creates a climate in early spring including day and night (in the case of Japan).

Irradiation times t1, t2, and t4 may be 12 hours/day (non-all-day irradiation) similarly to irradiation time t5, but if these are set longer than irradiation time t5, the growth speed can be accelerated. In particular, when irradiation times t1, t2, and t4 are set to 24 hours/day (all-day irradiation), the growth speed can be maximized (in this case, the cultivation environments in steps 1 and 2 may be the same.). However, according to the result of the demonstration experiment performed by the inventor, regarding irradiation time t1, it was sufficient if a certain irradiation time could be secured, and no significant difference could be found in the growth even if the irradiation time was longer than that. Therefore, in consideration of the energy saving property, irradiation time t1 is not set to all-day irradiation but non-all-day irradiation (16 hours/day) shorter than the all-day irradiation ($t1<t2$, t4).

Figure 3:
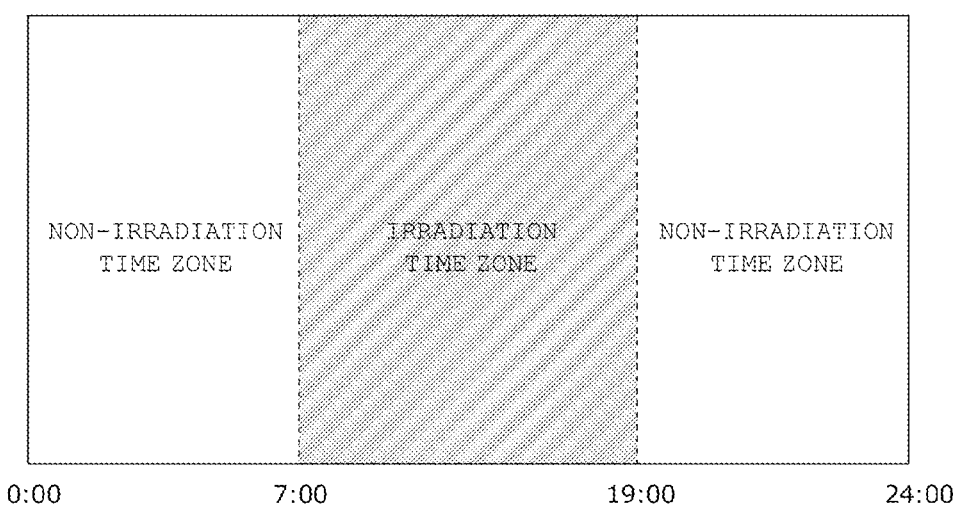
FIG. 3 is a diagram illustrating an example of an irradiation pattern.

Regarding the control of irradiation time t5, which is non-all-day irradiation, a predetermined irradiation pattern is repeated every day in order to artificially create day and night. FIG. 3 is a diagram illustrating an example of an irradiation pattern. This irradiation pattern has an irradiation time zone in which the irradiation with artificial light by the lighting device 4a and a non-irradiation time zone in which the irradiation with artificial light is not performed. In the case of the same figure, the irradiation time zone is from 7:00 AM to 7:00 PM, and the other time zone is the non-irradiation time zone. In the irradiation time zone, light energy is supplied by the irradiation device 4a, and photosynthesis is mainly performed in the strawberry stock.

In this way, in the closed environment, by varying irradiation times t1, t2, t4, and t5, the cultivation period as a whole is shortened, and the harvest amount of the strawberry is increased.

As for the carbon dioxide concentration (during irradiation with artificial light), which is an element of the cultivation environment, concentration C1 in step 1 and concentration C2 in step 2 are set to 400 ppm, and concentration C4 in step 4 and concentration C5 in step 5 are set to 800 ppm or more, and 1100 ppm in the present embodiment. During non-irradiation with artificial light, the cultivated product does not perform photosynthesis and does not consume carbon dioxide, and therefore there is no particular condition for the carbon dioxide concentration during non-irradiation. Here, the overall relationship of concentration during irradiation is C1, $C2<C4$, and C5. In steps 1 to 2, carbon dioxide is not consumed as much because the leaves are still small. Therefore, it is not necessary to supply a large amount of carbon dioxide from the outside, and it is not very meaningful even if a large amount of carbon dioxide is supplied. In contrast, in steps 4 to 5, a large amount of carbon dioxide is consumed by the large leaves. Therefore, the cultivation efficiency is enhanced by compensating for the consumption by the carbon dioxide feeder 4c.

Note that the specific values of the cultivation environment in steps 1 to 2 and 4 to 5 described above are merely examples, and in practice, the optimum values differ depending on the variety and characteristics of the strawberry.

Figure 4:
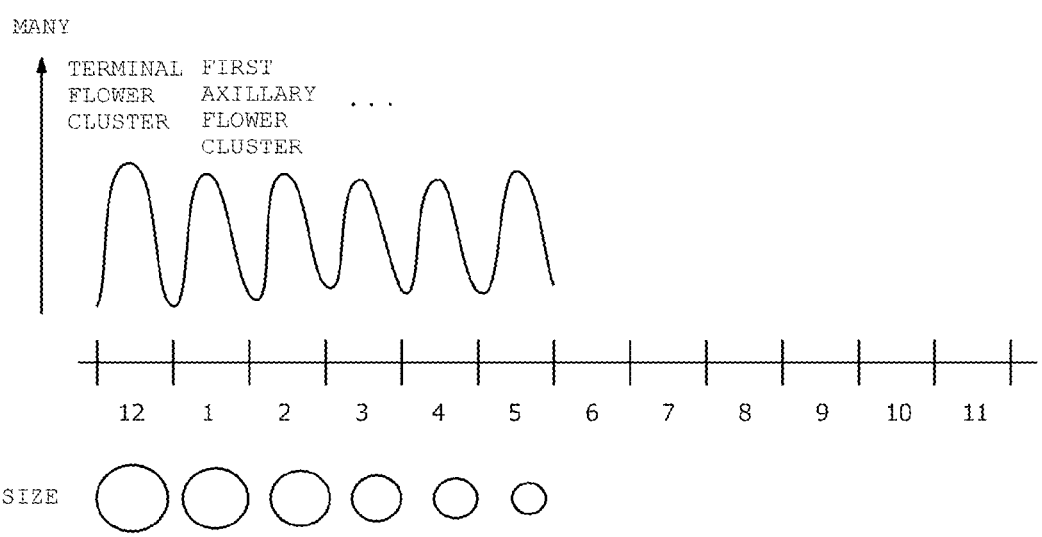
FIG. 4 is an explanatory diagram of continuous flowering according to a comparative example.
Figure 5:
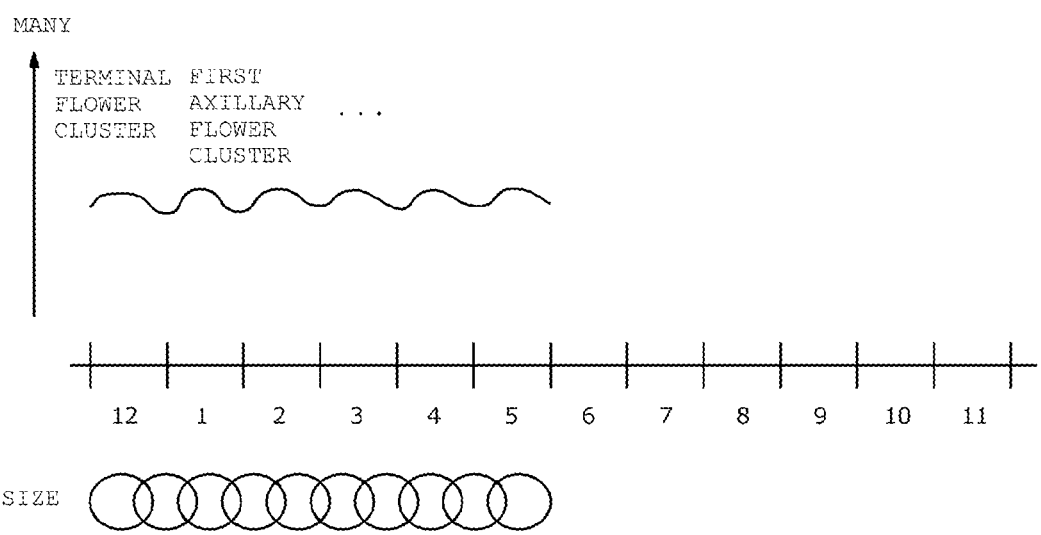
FIG. 5 is an explanatory diagram of continuous flowering according to an example.

Next, with reference to FIGS. 4 and 5, the transition of the flowering pattern according to the comparative example and the example will be described in comparison. First, in the case of the comparative example illustrated in FIG. 4, that is, in the case of strawberry cultivation in natural environments, the flowers continuously open in the order of the terminal flower cluster and the first axillary flower cluster, but a large valley (a state where the amount of flowering is extremely small) occurs before the next flower rises. In addition, as the flowering proceeds in stages, the size of the fruit gradually decreases, but the harvest amount tends to increase. On the other hand, in the case of the example illustrated in FIG. 5, that is, in the case of the strawberry cultivation in the closed environment according to the present embodiment, a valley as large as that in the comparative example does not occur until the next flower rises, and flowering at short intervals can be successively and continuously realized without causing a decline in plant vigor. In addition, even if the flowering proceeds in stages, the fruit can be controlled in an arbitrary size, and the quality such as size, color and taste can be made constant.

Thus, according to the present embodiment, all of steps 1 to 5 (in particular, steps 1 to 2, 4 to 5) is completed in the closed environment. As a result, the strawberry can be cultivated regardless of the season regardless of the natural environments such as sunlight and outside air, so that the season dependency of the strawberry cultivation can be eliminated. In addition, by performing cultivation under a management environment in which the influence of natural environments as a disturbance factor is eliminated as much as possible, it is possible to uniformize the quality of fruits. Furthermore, there is no risk of virus contamination or the like by cutting off contact with the outside, so that healthy strawberries can be cultivated.

In addition, according to the present embodiment, in consideration of growth characteristics unique to strawberry, irradiation time, temperature, carbon dioxide concentration and the like are controlled by the environment adjusting device 4 so as to be the first cultivation environment suitable for germination of strawberry in step 1, the second cultivation environment suitable for growing strawberry seedling in step 2, the third cultivation environment suitable for flowering of the terminal flower cluster in step 4, and the fourth cultivation environment suitable for continuous flowering of the first and subsequent axillary flower clusters in step 5. As described above, by classifying the growth stage of strawberry into a plurality of steps from the viewpoint of the cultivation environment and setting the first to fourth cultivation environments suitable for each step, it is possible to stabilize and improve the efficiency of continuous flowering of strawberry including shortening of the cultivation period and energy saving. In this regard, it is possible to perform all steps of the strawberry cultivation in the same cultivation environment, but from the viewpoint of improving the cultivation efficiency and the like, it is significant to classify the steps into the steps as in the present embodiment and adjust the cultivation environment according to the step. In particular, adjustment of the temperature is extremely important in efficiently cultivating strawberries.

Furthermore, according to the present embodiment, the environment adjusting device 4 is feedback-controlled on the basis of the information detected by the environment sensor 2 (the current status of the cultivation environment) so as to achieve the first to fourth cultivation environments. This makes it possible to control the first to fourth cultivation environments with high accuracy.

Further, according to the present exemplary embodiment, the closed environment is divided into the plurality of cultivation chambers A and B, and steps 1 to 2 are performed in the cultivation chamber A, and steps 4 to 5 are performed in the cultivation chamber B. As described above, the cultivation space is changed according to the growth stage of strawberry, and the arrangement interval of the cultivated products is made adjustable, so that it becomes possible to improve mass productivity.

The method for cultivating strawberry according to the present invention can be effectively applied to any vegetative propagation type strawberry and any seed propagation type strawberry regardless of the variety and characteristics of the strawberry.

REFERENCE SIGNS LIST

1 Environmental control system
2 Environment sensor
2a Temperature sensor
2b Humidity sensor
2c Concentration sensor
3 Control unit
4 Environment adjusting device
4a Lighting device
4b Air conditioning facility
4c Carbon dioxide feeder

The invention claimed is:

1. A method for cultivating strawberry in a closed environment in which a cultivation environment including temperature is adjusted by an environment adjusting device, the method comprising:
   a first step of germinating a strawberry seed by controlling the environment adjusting device so that the cultivation environment is at a first temperature;
   a second step of growing a strawberry seedling germinated by controlling the environment adjusting device so that the cultivation environment is at a second temperature;
   a third step of further growing the strawberry seedling to cause a terminal flower cluster to flower by controlling the environment adjusting device so that the cultivation environment is at a third temperature lower than the first temperature and the second temperature; and
   a fourth step of causing first and subsequent axillary flower clusters to successively flower by controlling the environment adjusting device so that the cultivation environment is at a fourth temperature lower than the first temperature and the second temperature and higher than the third temperature.

2. The method for cultivating strawberry according to claim 1, wherein artificial light necessary for strawberry to perform photosynthesis is irradiated as an element of the cultivation environment by the environment adjusting device, and a photon flux density of the artificial light emitted by the environment adjusting device is 350 μmol or more.

3. The method for cultivating strawberry according to claim 2, wherein irradiation times of artificial light in the first to third steps are longer than that in the fourth step.

4. The method for cultivating strawberry according to claim 3, wherein irradiation time of artificial light in the first step is equal to or shorter than those in the second and third steps.

5. The method for cultivating strawberry according to claim 4, wherein the second and third steps are all-day irradiation.

6. The method for cultivating strawberry according to claim 3, wherein in the fourth step, an irradiation pattern having an irradiation time zone in which irradiation with artificial light is performed and a non-irradiation time zone in which the irradiation with artificial light is not performed is repeated every day.

7. The method for cultivating strawberry according to claim 2, wherein carbon dioxide concentration as an element of the cultivation environment is adjusted by the cultivation environment device, and
   carbon dioxide concentrations during artificial light irradiation in the first and second steps are lower than carbon dioxide concentrations in the third and fourth steps.

8. The method for cultivating strawberry according to claim 1, wherein carbon dioxide concentration as an element of the cultivation environment is adjusted by the cultivation environment device, and
   the carbon dioxide concentrations during artificial light irradiation in the first and second steps are lower than the carbon dioxide concentrations in the third and fourth steps.

9. The method for cultivating strawberry according to claim 8, wherein the carbon dioxide concentrations during artificial light irradiation in the third and fourth steps are 800 ppm or more.

* * * * *